United States Patent [19]

Lacy, Jr. et al.

[11] 4,416,210
[45] Nov. 22, 1983

[54] DRILL BARGE TRANSPORT BY SURFACE EFFECT VEHICLES

[76] Inventors: Ray S. Lacy, Jr.; Thomas P. Johnson, both of P.O. Box 205, Orange, Tex. 77630

[21] Appl. No.: 167,722

[22] Filed: Jul. 11, 1980

[51] Int. Cl.³ .............................................. B60V 1/06
[52] U.S. Cl. .................................... 114/67 A; 114/26; 440/91; 180/121
[58] Field of Search .................. 440/37, 90, 91, 92; 114/67 A, 67 R, 26, 29, 147, 264, 265, 294; 180/121, 122, 127, 128, 129, 130

[56] References Cited

U.S. PATENT DOCUMENTS

| 2,934,905 | 5/1960 | Woolslayer et al. | 114/264 X |
| 3,183,988 | 5/1965 | Jones . | |
| 3,279,412 | 10/1966 | Howard | 114/294 X |
| 3,399,644 | 9/1968 | Hunt | 114/67 A |
| 3,401,767 | 9/1968 | Barr | 180/121 |
| 3,473,624 | 10/1969 | Mezhlumov et al. | 180/127 |
| 3,662,853 | 5/1972 | Love | 180/121 |
| 3,693,729 | 9/1972 | Blurton et al. | 114/264 |
| 3,786,893 | 1/1974 | Joyce et al. | 180/121 X |
| 3,840,089 | 10/1974 | Allison | 180/116 |
| 4,279,603 | 7/1981 | Harcourt et al. | 440/90 |

FOREIGN PATENT DOCUMENTS

1207960 10/1970 United Kingdom ................ 180/128

Primary Examiner—Trygve M. Blix
Assistant Examiner—Stephen P. Avila

[57] ABSTRACT

A method and apparatus are disclosed to transport and position a drilling rig over dry land, marshland and water. Surface effect vehicles having drive and positioning means that develop thrust against the surface over which they travel are used to lift and transport a drilling barge, after which they may be used as support and supply vehicles. Provision is made to adjust variable cargo loads so as to balance the assembled unit during transport.

5 Claims, 14 Drawing Figures

DRILL BARGE TRANSPORT BY SURFACE EFFECT VEHICLES

FIELD OF THE INVENTION

This invention relates to the transport of mobile drilling systems that are substantially preassembled. More specifically it relates to the transport of drill barges over surfaces impassable to trucks or boats, such surfaces being marshlands, swamps and deep mud banks.

BACKGROUND OF THE INVENTION

When required to drill in marshes and mud flats, one practice for many years has been to dredge canals to drill sites so the drilling equipment could be floated to location on a barge. Such dredging often causes ecological damage, destroying estuaries and other natural habitats. Another practice used to move land rigs to a drill site is to build roads by laying timber which is extremely expensive and causes waste of a great many trees as well as the residual damage to the countryside, the natural slopes, drain fields and such. Obviously, delays and costs become excessive and logistics become tedious. Various types of "swamp buggies" and such devices have been successfully used to transport personnel and light equipment but to transport large heavy loads such as a drill barge over marshland, water and dry land, it is necessary to establish a common interface such as an air cushion between the vehicles and the earth's surface so as to reduce friction, bow resistance and stern drag to a minimum and to reduce environmental damage. Thus, the cost, power and weight required to propel a vehicle riding on an air cushion as known, and is at a minimum.

U.S. Pat. No. 3,183,988, depicts the use of many relatively small ground effect vehicles spaced contiguously around the periphery of the much larger unit to be transported. U.S. Pat. No. 3,840,089, depicts a similar arrangement but with means to maintain all units in rigid assembly.

However, no provision is made for firm and continuous position control. Should a surface effect vehicle carrying a heavy load, like a drilling rig and other necessary drilling equipment, travel along a surface having a slight slope sidewise, undesirable side movement would occur, causing the vehicle to go off course and perhaps to crash into trees or such. Also, when positioning with respect to an existing wellhead for workover operations, no moving off from a completed well, crashing into the wellhead is likely to occur due to the highly unstable position control of a conventional surface effect vehicle. Even a gust of wind can cause a sudden and unexpected movement of a conventional surface effect vehicle.

The use of numerous small surface effect vehicles to transport a drilling barge to marshland wellsites is not desirable due to the remote locations of such sites. Substantial manpower requirements to attach and detach such multiple units under remote marshland conditions, and to return them to some storage location would make their use to move drill rigs questionable at best. Since drill rigs are usually on a site for long periods of time, to leave the small vehicles attached would not be economically feasible and would subject them to severe damage during normal drilling and handling operations.

Mounted on a typical drilling barge are items of great weight, such as the derrick, substructure, mud pumps, generators, mud system tanks and draw works which cause the average total weight per square foot of bearing load of the barge hull to be greater than an air cushion under the barge hull alone can support. Prior art noted above indicates that the barge hull must be made big enough to gain more area and therefore sufficient lifting capacity for transport, although the excess area is not required for the drilling operation.

During the drilling of a deep well, many unpredictable circumstances occur, requiring the storage of large amounts of pipe, fuel, mud, fresh water, salt water chemicals and such, at any given time. Accordingly, when the rig is to be moved off location, whatever materials are on board, must be moved with the rig to the next drillsite especially since environmental considerations prevent dumping and since transport costs over marshland discourage temporary storage at some distant location while the rig is being moved to the new drillsite. Therefore, considerable quantities of pipe and liquids must be moved on a surface effect vehicle which requires a load distribution far more precise than is required aboard a ship. Accordingly, there is need for a system to adjust the combined effect of fixed loads, solid variable loads and fluid variable loads so as not to cause the surface effect vehicles to list or dip excessively.

SUMMARY OF THE INVENTION

This invention comprises a novel method and means to transport and operate a drilling rig for drilling oil and gas wells over dry land, marshland and water in a manner having: precise position control; functional support vehicles arranged for intermittant duty to move the rig from one drillsite to another the arrangement being such that the power required to lift in minimized; provision to balance unpredictable loads that are to be transported aboard the rig and without taking extra weight aboard for ballast; the ability to travel without damage to the environment; and the ability to move with respect to a location with a minimum of danger of damage to a wellhead.

One feature of the invention has provided a method and means for the transport of a drilling rig over variable terrain such as dry land, marshland and water without damage to the environment.

Another feature of this invention is to provide a method and means for transport of supplies during drilling operations in a marshland area, without damage to the environment.

Another feature of this invention is to provide a method and means to transport a given total rig weight with a minimum sized barge by surface effect vehicles.

Another feature of this invention is to provide drive means for a surface effect vehicle so as to allow precise positioning and control of the vehicle.

Another feature of this invention is to provide drive means for a surface effect vehicle having the capability of operating over and developing thrust against surfaces including: uneven dry land; marshland; water.

Another feature of this invention is to provide a method to form an air cushion under the drilling rig so that the total rig load that must be transported by the surface effect vehicles can be lifted and moved with a minimum of horsepower input.

Another feature of this invention is to provide a surface effect vessel having means to adjust some of the load on board so as to effect the desired balance of the vehicle as required for proper vehicle travel.

Another object is to provide a drill barge arrangement which is moved by surface effect techniques and which is provided with an over-the-side cantilever drilling arrangement facilitating movement of the barge with a minimum of danger to an existing wellhead and also providing a very stable on-bottom base for the drilling operation.

Another object is to provide such a drill barge arrangement with a means for more positively controlling the movement thereof and, if desired, aiding in the actual movement.

DETAILED DESCRIPTION OF THE PREFERRED EMBODIMENT

Figure 1:
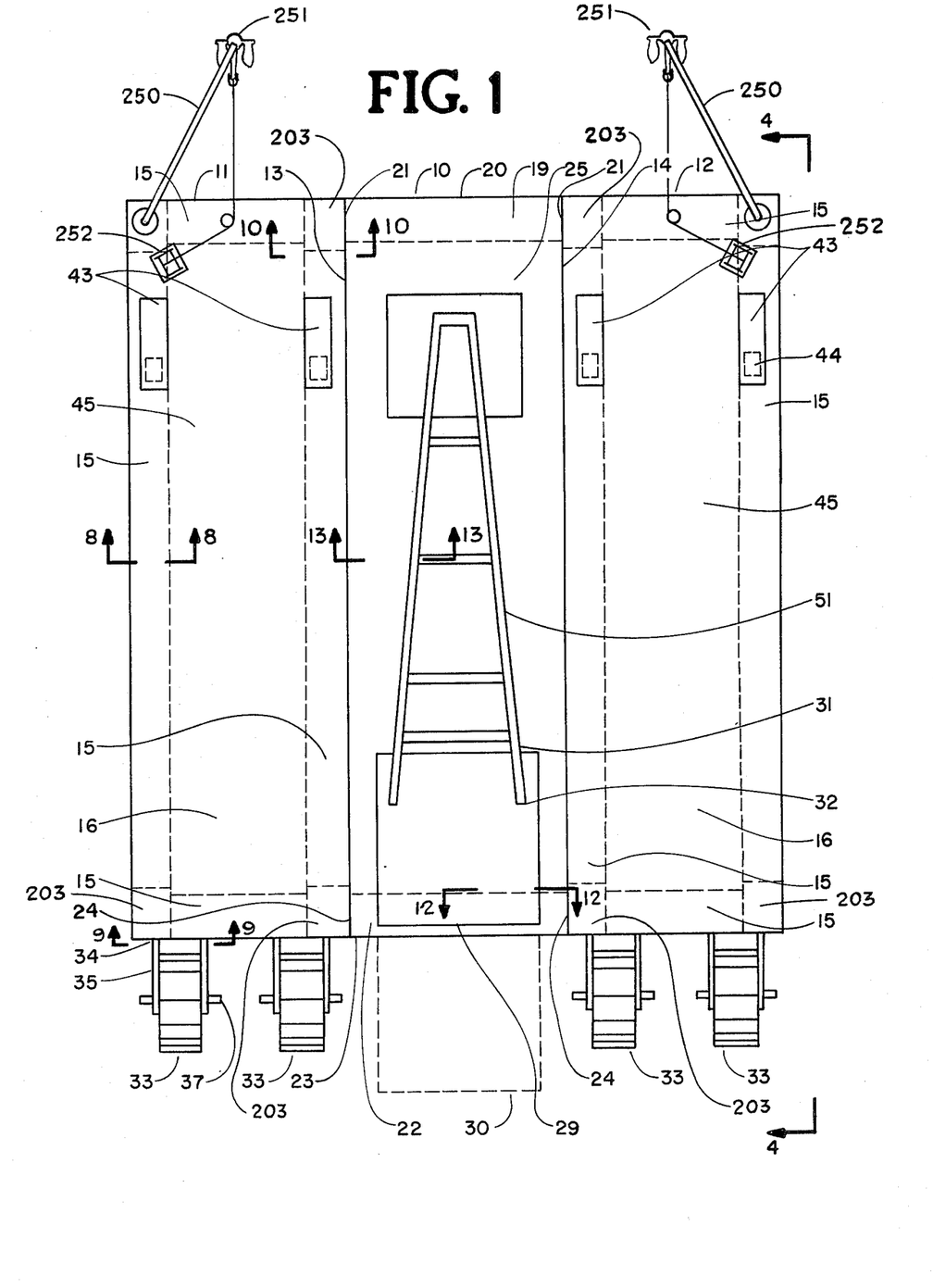
FIG. 1 is a plan view of the drilling barge and a surface effect vehicle attached to each side in transport configuration.
Figure 4:
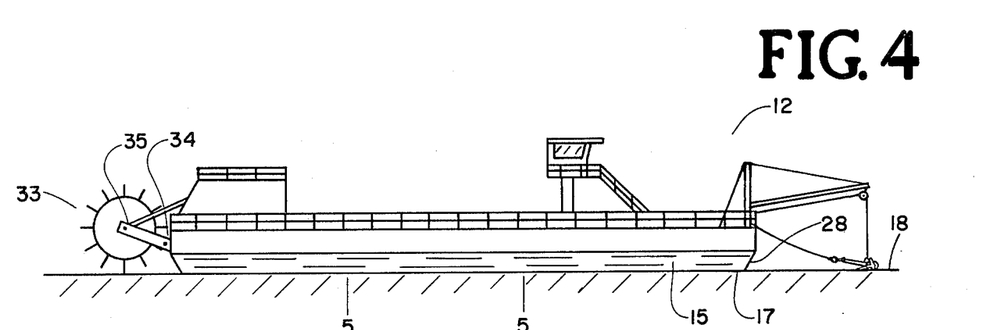
FIG. 4 is a side view of a ground effect vehicle illustrating the skirt along the bottom and which extends around the periphery of the vehicle.
Figure 5:
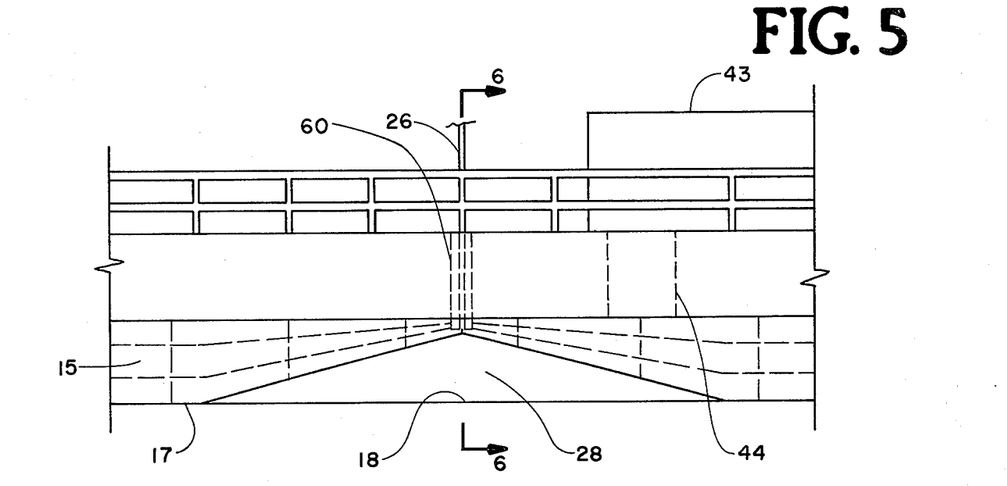
FIG. 5 is an enlarged fragmentary view of FIG. 4 between lines 5—5 illustrating the lifting of a side skirt of a surface effect vehicle as is required to furnish compressed air to form an air cushion under the drilling barge.

As shown by plan view of FIG. 1 drilling barge 10 is illustrated in transport configuration, being positioned between and detachably connected to and sealed against surface effect vehicles 11 and 12, along the length of their sides as at 13 and 14, respectively. Each vehicle 11 and 12 has a continuous skirt 15 around its lower periphery; the skirt being suitable for retaining an air cushion in plenum 16 of each respective vehicle; the lower edge 17 of skirt 15 being capable of maintaining contact with the earth's surface 18 as shown in FIG. 4 so as to retain said air cushion within plenum 16; thereby giving the vehicle vertical support over dry land, water or marshland.

Barge 10 has partial skirt 19 along its lower front end 20, skirt 19 being sealingly connected at each end to vehicle skirts 15 as at 21; partial skirt 22 at its lower rear end 23; partial skirt 22 being sealingly connected to vehicle skirts 15 as at 24 so as to retain an air cushion within plenum 25 under barge 10. For the purpose of supplying compressed air to plenum 16 so as to form an air cushion under the vehicle, fans 43 are provided. Fans 43 are driven by any suitable means and provide compressed air to plenum 16 through ducts as at 44 which are formed through the deck 45 of vehicles 11 and 12. Fans 43 must typically be capable of maintaining an air pressure of about one and one half pounds per square inch within the plenums, making up for air lost past skirts 15, 19 and 22.

Figure 6:
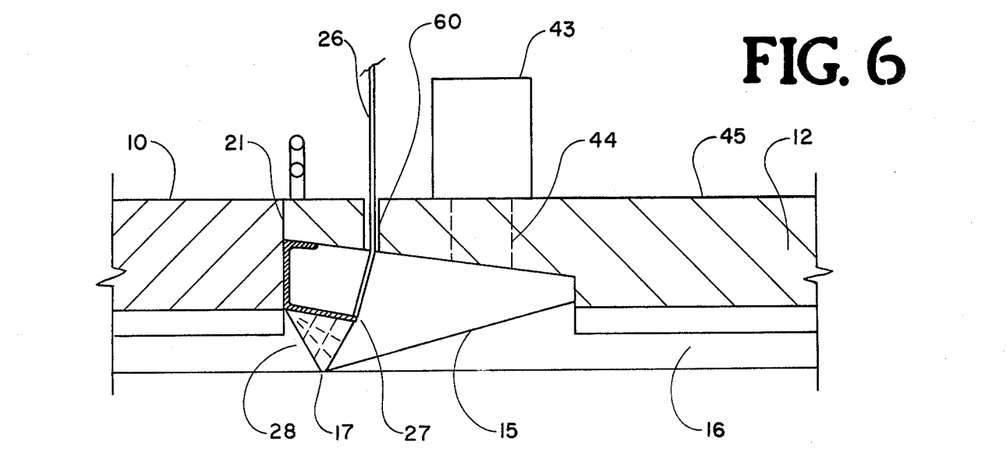
FIG. 6 is a fragmentary section of FIG. 5 taken along line 6—6 illustrating lifting of this skirt by a suitable means such as a rope, cable or rod.

As shown in FIG. 6, lifting means such as rope 26 is fastened to skirt 15 passing through opening 60 in deck 45 and when pulled, a portion of skirt 15 adjacent barge 10 may be lifted as to form flowpath 28 and thereby allow the transfer of some of the compressed air from plenums 16 of the vehicles into plenum 25 of barge 10, the air cushion then being retained under the connected assembly of barge 10, vehicle 11 and vehicle 12 by means of the portions of skirt 15 not adjacent barge 10 and the partial skirts 19 and 22 of barge 10. Thereby, plenum 25 is sealed and made capable of acting together with plenums 16 of vehicles 11 and 12 as to support a heavier load than only plenums 16 could support.

Figure 2:
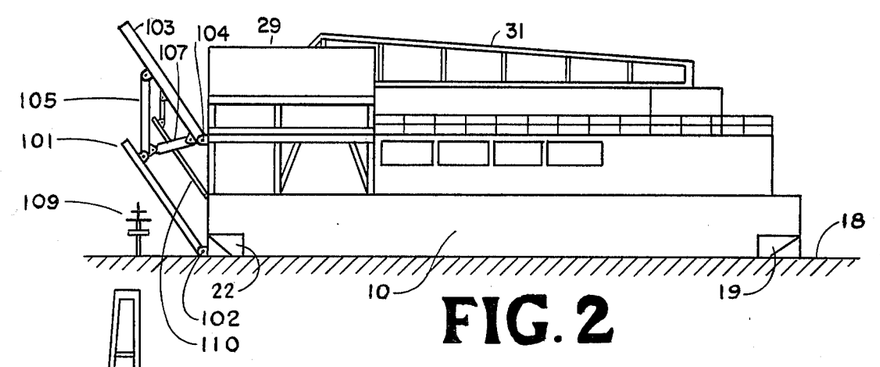
FIG. 2 shows a side view of the drilling barge having the derrick and substructure in transport configuration.
Figure 2A:
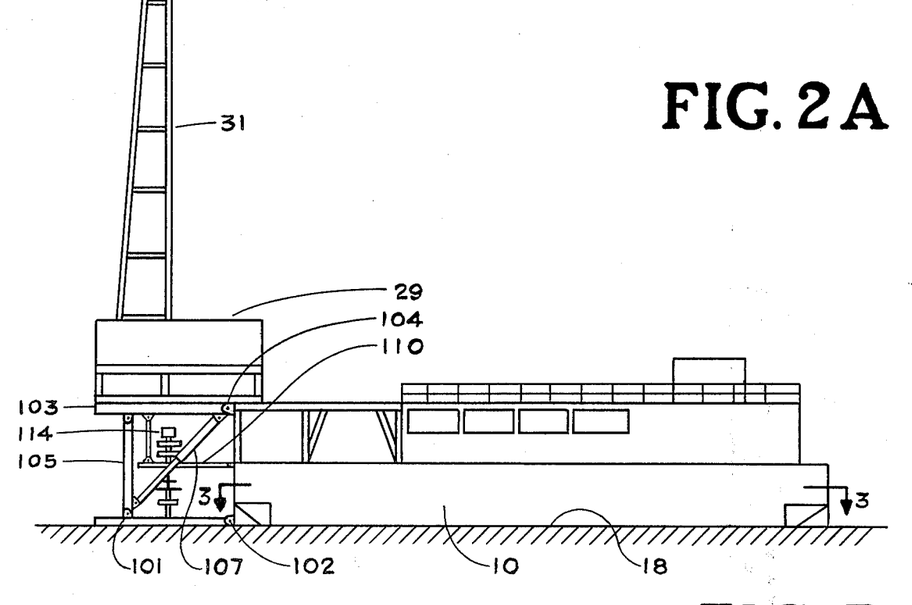
FIG. 2A is a view similar to FIG. 2 except the derrick and substructure are shown in drilling configuration.
Figure 7:
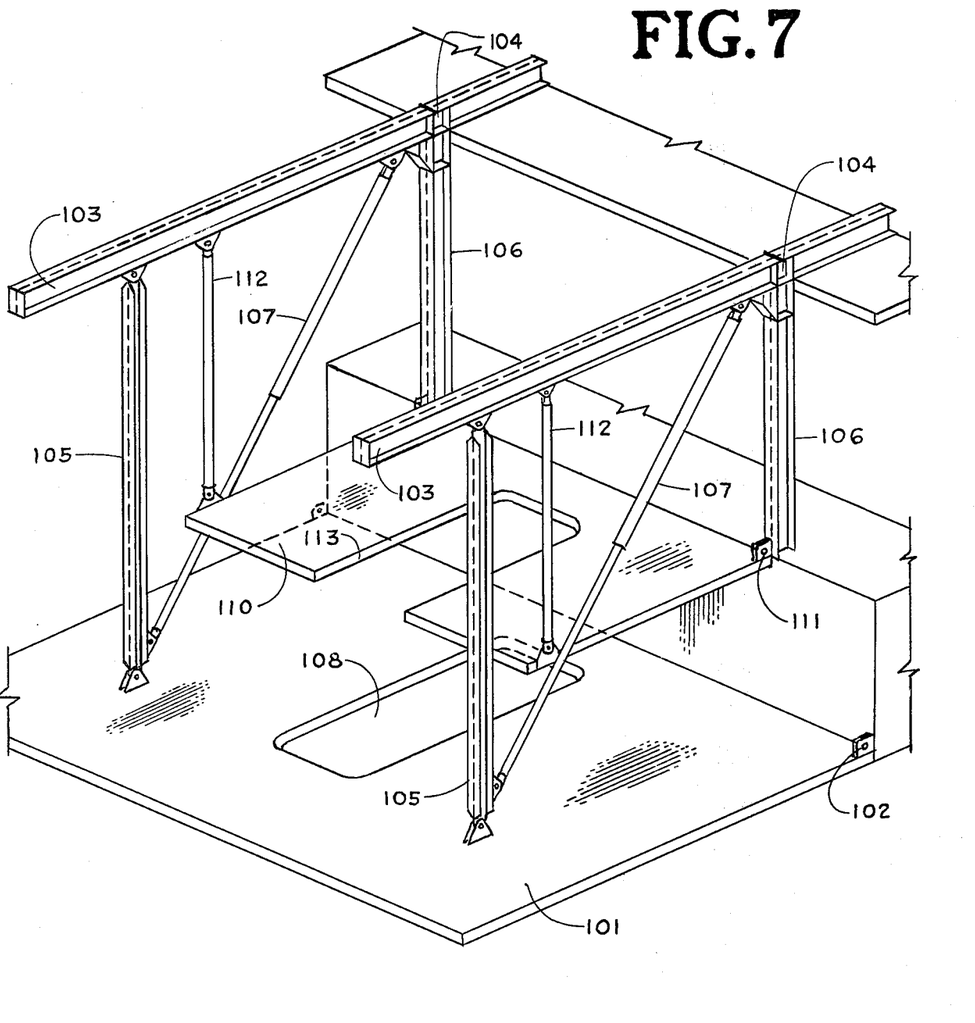
FIG. 7 is an enlarged view of the cantilever and mat arrangement at one end of the barge for supporting the derrick in drilling position.

As best shown in FIGS. 2, 2A and 7, an arrangement is provided wherein the drilling structure 29 can be skidded from an inboard transport position, as shown in FIG. 2, to an outboard drilling position as shown in FIG. 2A. To permit this, the front end of the barge is provided with a parallelogram cantilever arrangement which can be moved from a raised position as shown in FIG. 2 to a lowered or drilling position as shown in FIG. 2A, so that the drilling rig can be skidded to a drilling position. The parallelogram consists of a mat 101 hinged at its inboard end to the barge as at 102. It also includes skid beams 103 hinged at their inner ends 104 to the barge. The other two sides of the parallelogram are provided by columns 105 and 106 together with the barge. Suitable means, such as hydraulic cylinders 107 can be used to move the parallelogram arrangement between lowered and raised position.

It will be noted that mat 101 in lowered position is flush with the lower edge of the front end of the barge so that when it is lowered, it in effect acts as an extension of the barge for supporting the load of the drilling rig.

Also, the mat is provided with a suitable drilling slot 108 which is proportioned to clear christmas tree 109 (FIG. 2) when the mat is raised to permit moving of the barge.

A working platform 110 can also be provided as part of the cantilever arrangement. Thus the platform is hinged to the barge as at 111 and is connected to the skid beams 103 by a pair of parallel linkages 112 so that the platform can be raised as shown in FIGS. 2 and 2A. The platform can be provided with a slot 113 to accommodate the blowout preventers 114.

Figure 11:
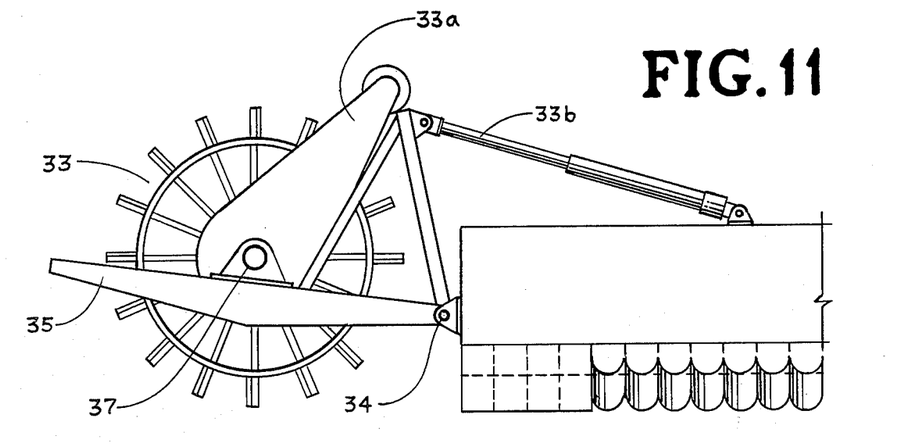
FIG. 11 is an enlarged view of one end of a surface effect vessel showing more clearly the paddlewheel arrangement.

As illustrated in FIGS. 1 and 11, paddlewheels 33 are controllably and pivotably mounted at 34 to the rear of each of vehicles 11 and 12 so as to contact and drive against surface 18 be it dry land, water or mud. Paddlewheels 33 are preferably mounted in pairs as shown in FIG. 1 so as to give positive steerage to the vehicle by driving one at a different speed than the other. Rocker arms 33 for supporting the paddlewheels 33 may be pivotably positioned on the vehicle and with respect to surface 18 so as to exert a desired normal driving force against surface 18 and arm 35 may be furnished with conventional springs and shock absorbers, not shown, so each individually may momentarily rise over a bump as does the rear wheel of an automobile. Paddlewheel 33 is axially mounted as at 37 on rocker arm 35 so as to pivot up and down with respect to the vehicle while moving over bumps in surface 18 so as to maintain a desired driving contact force against surface 18. Paddlewheel 33 is driven by any suitable power train 33a so as to propel and position the vehicle together with any attached loads the vehicle may be transporting, such as barge 10. Paddlewheels 33 may be independently driven at different speeds so as to effect a turning of the vehicle and to effect an extremely tight radius turn with excellent control, the paddlewheel may be driven in opposite directions. Also their vertical position can be controlled by suitable means such as hydraulic cylinder 33b (FIG. 11).

Figure 3:
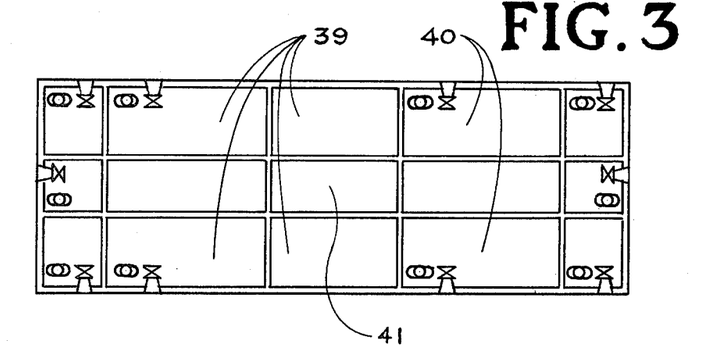
FIG. 3 is a horizontal section of the drilling barge taken along line 3—3 of FIG. 2A to illustrate storage tanks below deck.

FIG. 3 illustrates a horizontal section of barge 10 taken through fluid tanks used for fuel, drilling water, sewage and other useage. Similar arrangements may be used within the vehicles. So as to prepare for transport, it is necessary to balance variable loads aboard the barge and vehicles. To that end, tanks 39 which contain the same liquid are positioned such that they may be balanced by pumping liquid from one tank to the other no matter what amount is left in them. Likewise, tanks 40, containing another common liquid may be balanced by pumping liquid between the tanks to effect the desired weight distribution. Pump room 41 may be conveniently located so that pumps, valves and conduits, all well known in the art, but not shown herein, may be conveniently interconnected with tanks holding like liquids so as to balance like liquids between the proper tanks.

Figure 9:
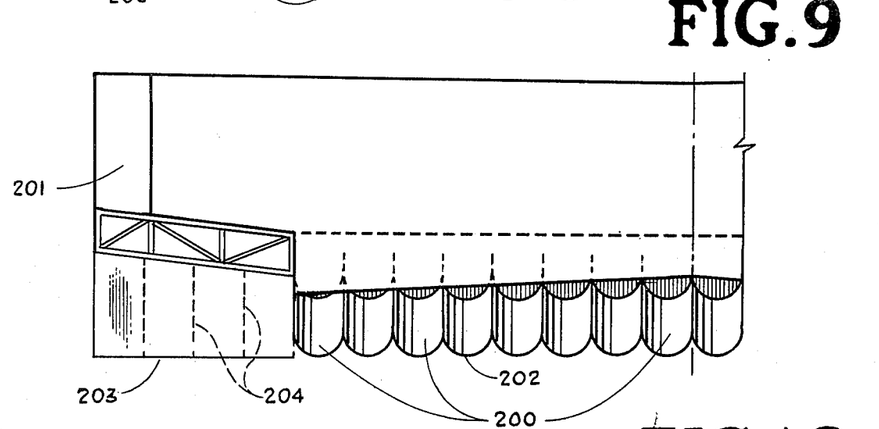
Figure 10:
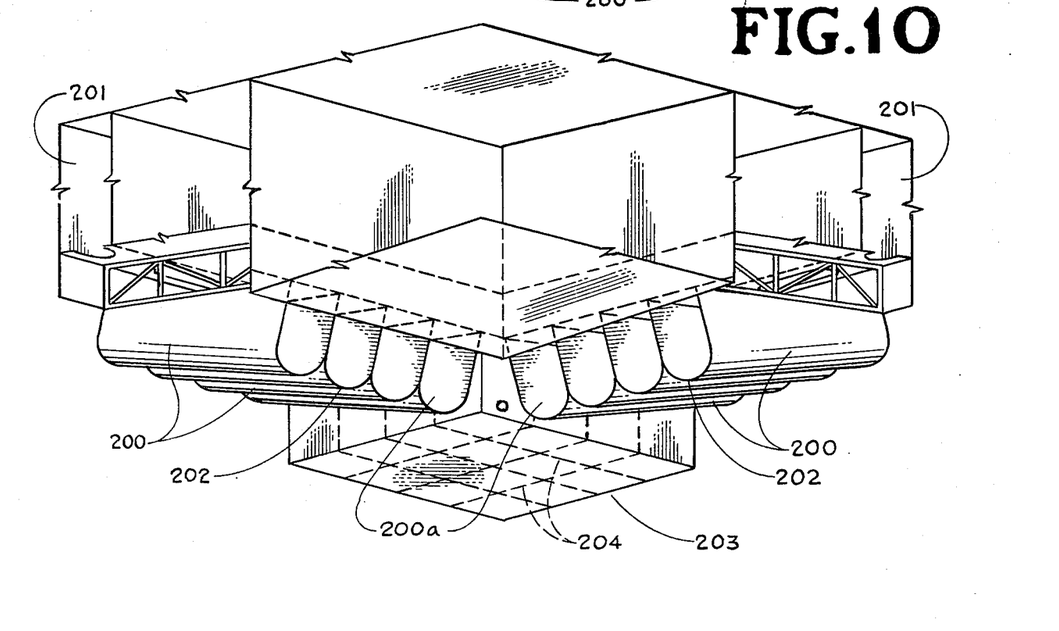
FIG. 10 is a view from the underside of a surface effect vessel showing the skirt arrangement at the corners of the vessel.

Referring to FIGS. 9 and 10, an improved skirt arrangement for the corners of the transport vehicles is shown. The skirts along the sides and ends of these vehicles consist of conventional cells 200 of flexible material which receive air from ducts 201. As is known, in actual use the inner lower ends 202 deform to conform with the surface to be sealed against so that in totality, the cells act as a skirt to confine air in the plenum chambers although it will be understood that there are some leakages past the skirt to the atmosphere. However, it is a problem to arrange these cells at the corners of the vehicles so as to not permit the escape of prohibitive amounts of air. As shown best in FIGS. 9 and 10, the cells at the corner are replaced with a square or rectangular bag 203 which is of flexible material similar to that of the cells and which abuts the cells at the ends of the side and end skirts to form a seal therebetween when in operation. The bag is preferably subdivided into a plurality of vertical chambers, each open at the bottom, by a plurality of partition wells 204. These chambers receive air from ducts 201 and, in operation, the lower ends thereof conform closely to the ground or other surface to minimize escape of air.

As shown in FIG. 1, the forward end of each of the transport vessels is provided with an anchor crane 250 which is used to position an anchor 251 forwardly of the vehicle at any desired location within the sweep of the crane. By manipulating the cranes and power winches 252, the anchors can be dropped ahead or to one side of the vehicle and the winches can reel in to draw the vehicle toward the anchor or to maintain the vehicle on a desired course. This arrangement especially in combination with the paddlewheels allows the vehicle to traverse uneven terrain, such as sloping ground, which being maintained on a desired course.

Figure 8:
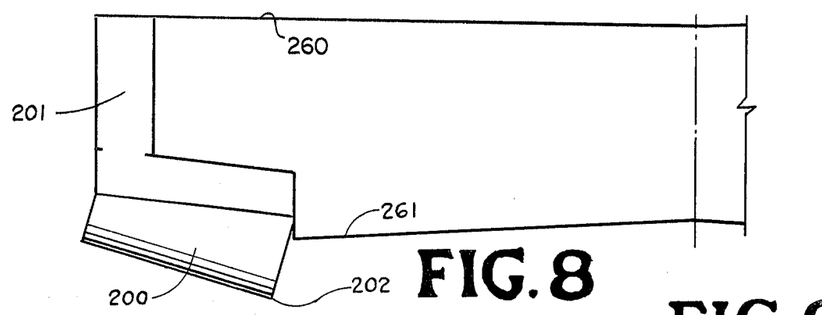
FIGS. 8 and 9 are views taken on the lines 8—8 and 9—9 of FIG. 1.
Figure 12:
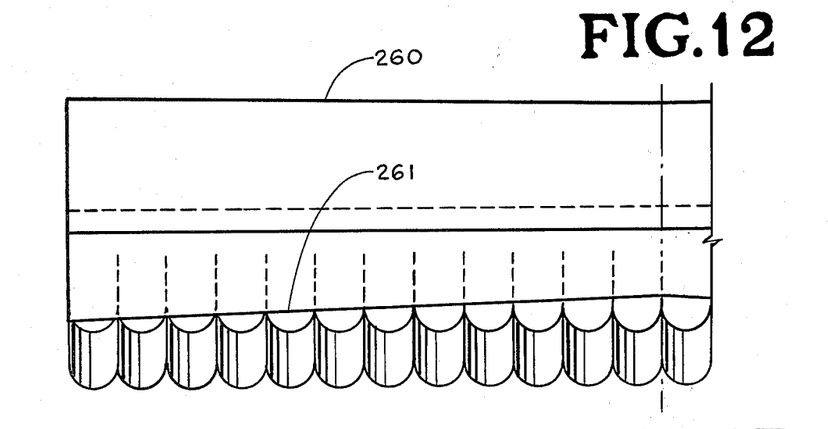
FIGS. 12 and 13 are views taken on the lines 12—12 and 13—13 of FIG. 1.
Figure 13:
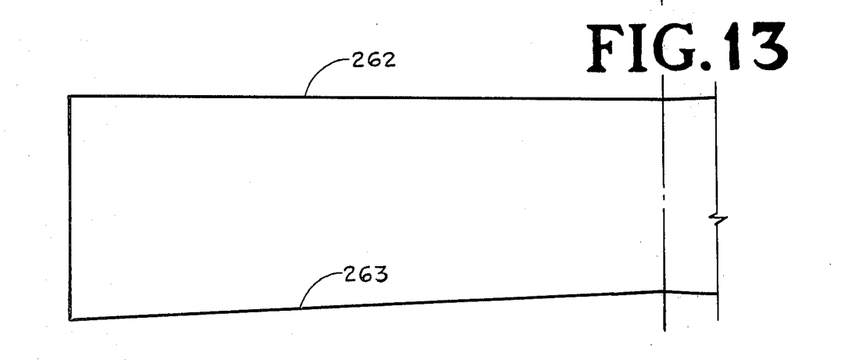

FIGS. 8 and 12 illustrates forming the deck 260 of the vehicle with a reverse camber to facilitate drainage of the deck toward the middle of the vehicle where liquids can gather to be disposed in any desired manner. It also illustrates forming the bottom of the vehicle hull with a reverse deadrise. This provides the hull with a bottom which can seat more firmly on the soil inasmuch as the sides of the hull will contact bottom first to form a firmer seat on the soil. The reverse deadrise also facilitates more uniform air flow under the entire vehicle during the initial stages of lift. Similarly, FIG. 13 illustrates the drilling barge deck 262 and bottom 263 with reverse camber and negative deadrise.

OPERATION OF THE INVENTION

Referring to FIG. 2A, drilling structure 29 is shown in drilling configuration, the structure 29 being supported by the parallelogram cantilever arrangement and the barge. When drilling operations are complete at one drillsite, drilling structure 29 is moved from its outboard position to its inboard position so as to be supported by barge 10, derrick 31 then being lowered to horizontal position as shown in FIG. 2. Tanks as at 39 are balanced so as to prevent uneven loading during transport. Vehicles 11 and 12 are positioned along opposite sides of barge 10 as shown in FIG. 1 and are sealing attached along the sides of barge 10 as at 13 and 14, respectively. Paddlewheels 33 being in contact with surface 18, provide accurate positioning of the vehicles with respect to barge 10 so as to facilitate the attachment and sealing therebetween. It will be appreciated that to use an air screw or the like for positioning means of a surface effect vehicle could cause position overshoot and could cause crashing of the vehicles against the barge, resulting in substantial damage and loss of time and loss of safety. Lifting means 26 are raised to lift a portion of skirts 15 along barge 10 to thereby create flowpath 38 and allow compressed air from plenums 16 of vehicles 11 and 12 to enter plenum 25 of barge 10. Skirt 15, not adjacent barge 10, acts to seal against surface 18. Skirts 19 and 22 seal against surface 18 and against skirts 15 so as to effect one plenum under the connected assembly of barge 10 with vehicles 11 and 12, which is then filled with compressed air by means of fans 43 via ducts 44 so as to overcome the combined weights of barge 10 and the vehicles to cause the barge to lift from its drilling position. Paddlewheels 33 then serve to move the assembly to a new location as desired, over dry land, water and marshland, bogs or the like without fear of becoming stuck or sinking. Because paddlewheels 33 are mounted on and supported by the vehicle, they do not sink or become stuck as would a tractor or the like, should it be used to tow the barge.

Movement across terrain having a side slope becomes a problem for surface effect vehicles that are driven by air screws because they tend to slide sidewise as if on ice, whereas paddlewheels 33 are in constant contact with surface 18 so as to maintain positive control of the vehicle and therefore of the barge during transport by maintaining a constant positive driving force against surface 18. In addition, the anchor cranes 250 can be used to lower anchors 251 at desired locations so that winches 252 can be operated to apply desired guiding forces to the vehicles and barges.

The barge and vehicles assembled according to the present invention can be moved into a nominal location for the barge after which the barge is lowered. The use of the cantilever arrangement does not require precise location of the barge in that the drilling structure can be moved outward to a precise position. The cantilever arrangement also permits the barge to be moved off location without endangering the wellhead.

After the barge is positioned, ropes 26 are lowered allowing skirts 15 to close flowpaths 38 to plenum 25 under barge 10. Vehicles 11 and 12 may be detached from barge 10 as at 13 and 14 respectively, thereby allowing vehicles 11 and 12 to move away for independent use as supply and support vehicles to the drilling barge.

As indicated above, the skirts along the sides of the vehicles next to the barge do not function as skirts when the barge is being moved. In that situation, the only functional skirt is that which extends along the outer sides of the vehicles plus that at the front and rear ends of both the vehicles and the barge. This effectively reduces the total effective skirt length compared to that which would exist if the vehicles were merely connected to the barge to transport it without utilizing the barge plenum. Reduction of the skirt length reduces, the power required to maintain the desired air pressure within the skirt.

It is therefore clear that a novel method and means for transporting and supporting a drilling barge over dry land, water and the like has been provided for the drilling of oil and gas wells and in a manner that is safe, efficient and is protective to the environment.

What is claimed is:

1. A method for the transport of a drilling rig over variable terrain such as marshlands, dry land and water, comprising the steps of:
   mounting sufficient equipment including a drilling rig for the drilling of a well on a drill barge such that when in transport configuration, the distribution of both dead loads and variable loads thereon may be made conducive to the balance of the barge; providing the front and rear ends only of the barge with a surface effect skirt; providing a first and a second surface effect vehicle, each having means for its own movement; positioning of the surface effect vehicles along opposite sides of the barge; detachably and sealingly connecting the surface effect vehicles to the sides of the barge; activating the surface effect vehicles by flowing compressed air under them and also flowing compressed air under the barge from at least one of the vehicles so as to lift and transport the barge to a desired location for the drilling of a well; and lowering the barge.

2. The invention of claim 1 further comprising:
   detaching and removing from the barge, at least one of the vehicles and using it as a supply transport vehicle.

3. The invention of claim 1 further comprising:
   moving the drilling rig outboard of one end of the barge and supporting it by a cantilever arrangement engaging the earth's soil outwardly of the barge.

4. The invention of claim 1 wherein an anchor crane is mounted on the vehicles to overhang the periphery of the vehicles by a substantial amount; an anchor; means including a first winch line connected to the anchor and extending along the crane and operable to raise and lower the anchor; and means including a second winch line connected between the anchor and a winch on the vehicles to exert a pull on the anchor independently of the first winch line to exert a force on the vehicles when the anchor is anchored.

5. A method of transporting a drilling barge comprising:
   providing surface effect vehicles adjacent only two opposite sides of the barge; the vehicles having skirts for retaining a cushion of compressed air below the vehicles; detachably and sealingly connecting the vehicles to opposite sides of the barge; providing partial skirts at the front and at the rear of the barge for retaining a cushion of compressed air underneath the barge; sealingly connecting the ends of the partial skirts at the front and rear of the barge to the skirts on the vehicles; providing compressed air to the area consisting of the area covered by the barge and both of the vehicles.

* * * * *